United States Patent
Goesmann et al.

(10) Patent No.: US 9,490,556 B2
(45) Date of Patent: Nov. 8, 2016

(54) CELL CONTACTING ARRANGEMENT FOR AN ENERGY STORAGE DEVICE

(71) Applicants: BAYERISCHE MOTOREN WERKE AKTIENGESELLSCHAFT, Munich (DE); DIEHL METAL APPLICATIONS GMBH, Berlin (DE)

(72) Inventors: Hubertus Goesmann, Auernheim (DE); Christoph Born, Munich (DE); Harald Heck, Nuremberg (DE); Frank Warmuth, Borkheide (DE)

(73) Assignees: Bayerische Motoren Werke Aktiengesellschaft, Munich (DE); Diehl Metal Applications GMBH, Berlin (DE)

( * ) Notice: Subject to any disclaimer, the term of this patent is extended or adjusted under 35 U.S.C. 154(b) by 84 days.

(21) Appl. No.: 14/357,500
(22) PCT Filed: Nov. 23, 2012
(86) PCT No.: PCT/EP2012/004861
§ 371 (c)(1),
(2) Date: May 9, 2014
(87) PCT Pub. No.: WO2013/075843
PCT Pub. Date: May 30, 2013

(65) Prior Publication Data
US 2014/0342620 A1 Nov. 20, 2014

(30) Foreign Application Priority Data
Nov. 24, 2011 (DE) .................. 10 2011 087 035

(51) Int. Cl.
*H01M 2/20* (2006.01)
*H01R 11/22* (2006.01)
(Continued)

(52) U.S. Cl.
CPC .............. *H01R 11/22* (2013.01); *H01M 2/202* (2013.01); *H01M 2/206* (2013.01); *H01R 33/88* (2013.01); *H01M 2/305* (2013.01)

(58) Field of Classification Search
CPC .................. H01M 2220/20; H01M 2/206
See application file for complete search history.

(56) References Cited

U.S. PATENT DOCUMENTS 689,929 A * 12/1901 Suren et al. .......... H01M 10/46
307/127
5,415,956 A 5/1995 Ching
(Continued)

FOREIGN PATENT DOCUMENTS

DE 8329237 1/1984
DE 29515860 1/1996
(Continued)

OTHER PUBLICATIONS

International Search Report and Written Opinion (no English translation available) for International (PCT) Patent Application No. PCT/EP2012/004859 mailed Feb. 6, 2013, 9 pages.
(Continued)

*Primary Examiner* — Stewart Fraser
*Assistant Examiner* — Olatunji Godo
(74) *Attorney, Agent, or Firm* — Sheridan Ross P.C.

(57) ABSTRACT

The present invention relates to a cell contacting arrangement for an energy storage module having a plurality of electrochemical storage cells, each storage cell having at least two electric connection terminals, the arrangement comprising: a carrier plate which is mountable on the energy storage module, and at least one cell connector inserted into the carrier plate for connecting at least two of the connection terminals of different storage cells, the carrier plate comprising at least one catch spring having a detent for fixing the cell connector in the carrier plate.

18 Claims, 2 Drawing Sheets

(51) Int. Cl.
*H01R 33/88* (2006.01)
*H01M 2/30* (2006.01)

(56) References Cited

U.S. PATENT DOCUMENTS

| | | |
|---|---|---|
| 5,639,571 A | 6/1997 | Waters et al. |
| 2010/0073005 A1 | 3/2010 | Yano et al. |

FOREIGN PATENT DOCUMENTS

| | | |
|---|---|---|
| DE | 60121114 | 2/2007 |
| DE | 102008034854 | 1/2010 |
| DE | 102008034871 | 1/2010 |
| DE | 102008034876 | 1/2010 |
| DE | 102009041738 | 2/2011 |
| DE | 102010064315 | 7/2011 |
| DE | 102010020065 | 11/2011 |
| DE | 102010039417 | 2/2012 |
| EP | 1775784 | 4/2007 |
| EP | 1629550 | 9/2008 |
| EP | 2339672 | 6/2011 |
| EP | 2445032 | 4/2012 |
| GB | 2330251 | 4/1999 |
| WO | WO 2011/038908 | 4/2011 |

OTHER PUBLICATIONS

International Search Report and Written Opinion (no English translation available) for International (PCT) Patent Application No. PCT/EP2012/004861 mailed Mar. 19, 2013, 9 pages.

International Search Report and Written Opinion (no English translation available) for International (PCT) Patent Application No. PCT/EP2012/004858 mailed Mar. 11, 2013, 13 pages.

\* cited by examiner

CELL CONTACTING ARRANGEMENT FOR AN ENERGY STORAGE DEVICE

CROSS REFERENCE TO RELATED APPLICATIONS

This application is a national application under 35 U.S.C. 371 and claims the benefit of PCT Application No. PCT/EP2012/004861 having an international filing date of Nov. 23, 2012, which designated the United States, which claims the benefit of German Patent Application No. 102011087035.0 filed Nov. 24, 2011, the entire disclosure of both the above-identified applications are incorporated by reference herein.

DESCRIPTION

The present invention refers to a cell contacting arrangement for an energy storage module having a plurality of electrochemical storage cells. Furthermore, the present invention refers to a high-voltage storage device comprising an energy storage module and the cell contacting arrangement.

In a high-voltage storage device, which is normally called battery, for the power supply of an automotive vehicle, energy storage modules are used for driving the vehicle, e.g. electric vehicles or hybrid vehicles. A respective energy storage module typically consists of a plurality of stacked storage cells. The individual storage cells contain electrochemical cells of the battery. The stack consisting of the individual storage cells is mostly clamped. Apart from the mechanical fixation of the modules relative to one another, clamping particularly serves to counteract deformation by gas pressure changes which during operation occur in the electrochemical cells arranged in the interior of the modules. The plurality of storage cells of the energy storage modules must be electrically connected to one another with cell connectors.

It is the object of the present invention to indicate a cell contacting arrangement for an energy storage module which, while being producible and mountable at low costs, has a flexible and modular structure and allows a reliable contacting of the storage cells.

This object is achieved by the features of the independent claims. The dependent claims refer to preferred developments of the invention.

Hence, the object is achieved by a cell contacting arrangement for an energy storage module having a plurality of electrochemical storage cells, each storage cell having at least two electric connection terminals. The cell contacting arrangement comprises a carrier plate mountable on the energy storage module and at least one cell connector inserted into the carrier plate. The cell connector serves to connect at least two of the connection terminals of different storage cells. In a series connection of the storage cells, a positive pole of a first storage cell is connected to a negative pole of a further storage cell, for instance, with the cell connector. Alternatively, the cell connector may also connect the storage cells in a parallel connection. Moreover, also more than two connection terminals of different storage cells can be connected to one another with a cell connector. According to the invention the carrier plate comprises at least one catch spring with a detent. The catch spring with the detent serves to fix the cell connector in the carrier plate. The cell connector is fixed in the carrier plate at a specific position by way of the detent. The catch spring allows a limited movement of the cell connector. This is for instance necessary when the cell connector is welded to the connection terminal because the cell connector expands here due to heating up. During operation of the energy storage module the cell connector may also heat up and thus expand. The use of the catch spring with detent thereby permits, on the one hand, a play-free positioning of the cell connector and prevents, on the other hand, a clamping of the cell connector within the carrier plate. Preferably, the carrier plate is made of plastics, particularly as an injection-molded part. The cell connectors preferably consist of metal, particularly aluminum. The cell contacting arrangement can thereby be fabricated without any further additives in a very advantageous and quick manner. The carrier plate particularly allows a preassembly of the cell connectors. The cell connectors are positioned in the carrier plate at specific positions, so that the cell connectors are seated at the correct place by mounting the carrier plate on the energy storage module and are directly connected to the connection terminal of the storage cells, specifically can be welded or soldered.

In a preferred configuration it is provided that the catch spring and the detent are integrally formed with the carrier plate. The carrier plate, the catch spring and the detent are thus an injection-molded part that was produced with a joint injection mold.

Furthermore, a catch spring with a detent is provided preferably per connection terminal contacted by the cell connector. Hence, when a cell connector connects two connection terminals, two catch springs with a respective detent are provided for this cell connector.

In a particularly preferred configuration, the catch spring is made arcuate. A first end of this arc shape is connected to the carrier plate. The detent is arranged on a second end of the arc shape. Owing to this arc shape the catch spring can be configured in a very simple manner as a plastic member.

Furthermore, it is preferably provided that the cell connector at the side opposite to the catch spring is pushed under a shoulder of the carrier plate. Upon assembly the cell connector is first pushed under this shoulder. Thereupon, the side of the cell connector that is still free is snapped under the detent. The cell connector is thereby fixed at two opposite sides in the carrier plate.

Preferably, the cell connector comprises connection surfaces which are configured for connection with the connection terminals. For instance, when the cell connector is used for contacting two connection terminals, said cell connector also comprises two connection surfaces. Said connection surfaces are placed on the connection terminal upon assembly and can be welded or soldered to the connection terminals.

Preferably, the detent is arranged such that it blocks a movement of the cell connector in a first direction. The catch spring is here arranged such that it allows a spring-loaded movement of the cell connector in a second direction perpendicular to the first direction. In the energy storage module the individual storage cells are particularly arranged such that all of the individual connection terminals are oriented towards a surface. The first direction particularly extends perpendicular to said surface. The detent thus blocks a lifting of the cell connectors from said surface of the energy storage module. The second direction is oriented in parallel with said surface of the connection terminal. Hence, the catch spring allows a limited, spring-loaded movement of the cell connector in parallel with the surface of the energy storage module. The connection surfaces of the cell connectors are particularly configured as a plate or are plate-shaped. This means that the connection surfaces substantially extend in one plane. This plane is in parallel with the surface on which the connection terminals of the energy storage module are placed. The above-mentioned second direction extends perpendicular to the direction of the thickness of said plate. When the cell connector is welded or soldered to the connection terminal or when the cell connector heats up during operation of the energy storage module, the cell connector is expanding. The cell connector primarily expands in the directions perpendicular to the thickness of the plate. That is why the catch spring permits a limited, spring-loaded movement of the cell connector in the second direction which is oriented perpendicular to the direction of the thickness of the plate.

In a further advantageous configuration it is provided that the connection surfaces of the cell connector for the connection terminal to be connected are arranged one after the other in a third direction. This third direction is perpendicular to the second direction. To permit also an expansion of the cell connector in this third direction, the cell connector between two connection surfaces comprises a connection arc for compensating for internal stresses in the cell connector.

Thus, the cell connector is configured to be plate-shaped in the regions where it is connected to the connection terminals. The connection arc is arranged between these regions. The cell connector is particularly produced as a punched and bent sheet-metal part.

Furthermore, the invention comprises a high-voltage battery for power supply, particularly of an automotive vehicle, comprising: an energy storage module and one of the just described cell contacting arrangements. The energy storage module has a plurality of electrochemical storage cells. Each of the storage cells has at least two electric connection terminals. The configurations presented within the scope of the cell contacting arrangement according to the invention are used in a correspondingly advantageous manner for the high-voltage battery according to the invention.

An embodiment of the invention shall now be explained in more detail with reference to the accompanying drawing, in which.

An embodiment of the invention shall now be explained in more detail with reference to FIGS. 1 to 3.

Figure 1:
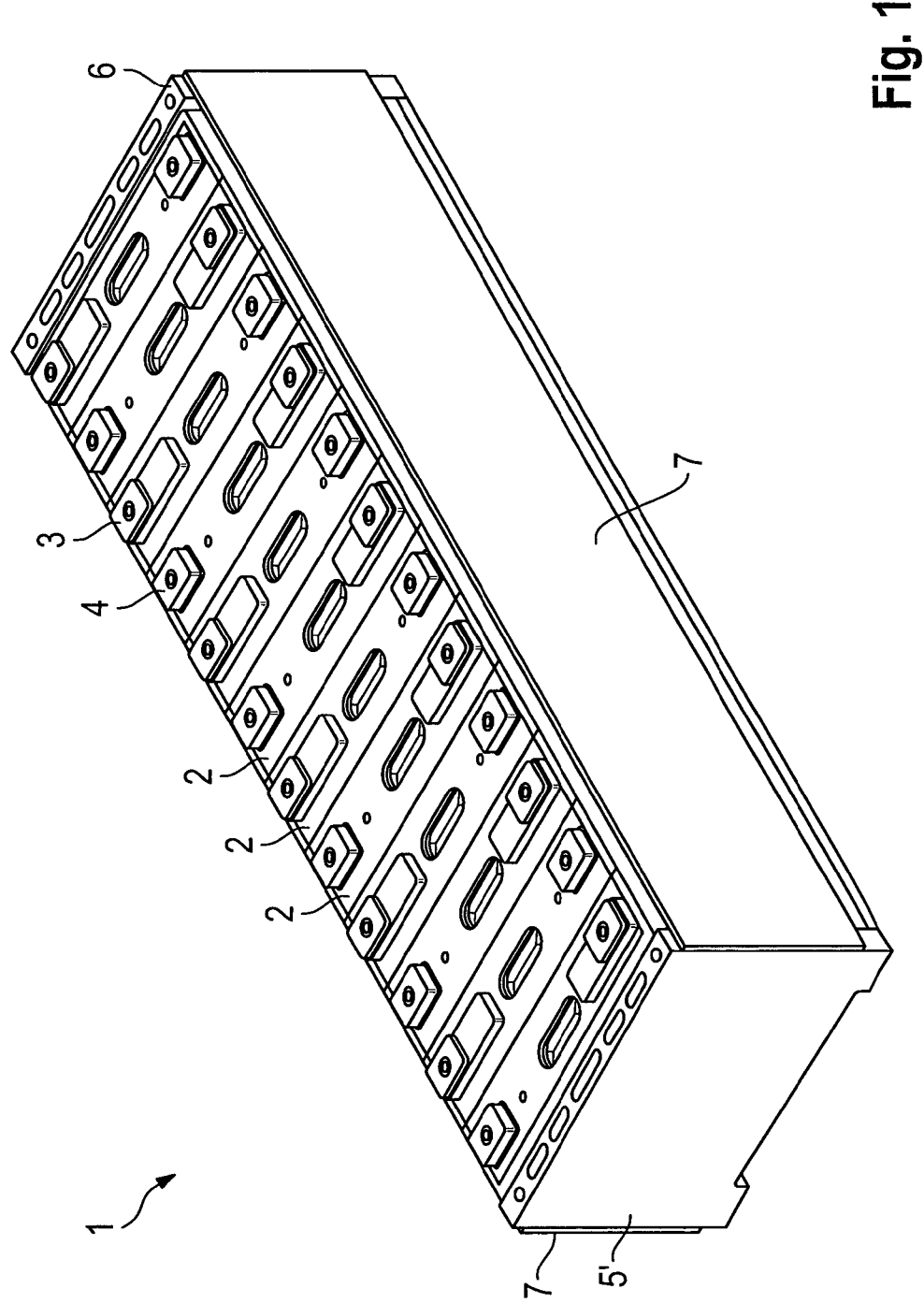
FIG. 1 shows an energy storage module on which a cell contacting arrangement of the invention according to an embodiment is mountable.

FIG. 1 shows an energy storage module 1 without the cell contacting arrangement 8 according to the invention. The cell contacting arrangement 8 as described hereinafter is mounted on said energy storage module 1. The energy storage module 1 comprises a plurality of storage cells 2 stacked one after the other in series. Each storage cell 2 comprises a first connection terminal 3 and a second connection terminal 4. The individual storage cells 2 are each arranged offset relative to one another, so that two connection terminals of different polarities are placed side by side. The storage cells 2 which are arranged one after the other are clamped with one another via two end plates 5, 6 and two tie rods 7.

Figure 2:
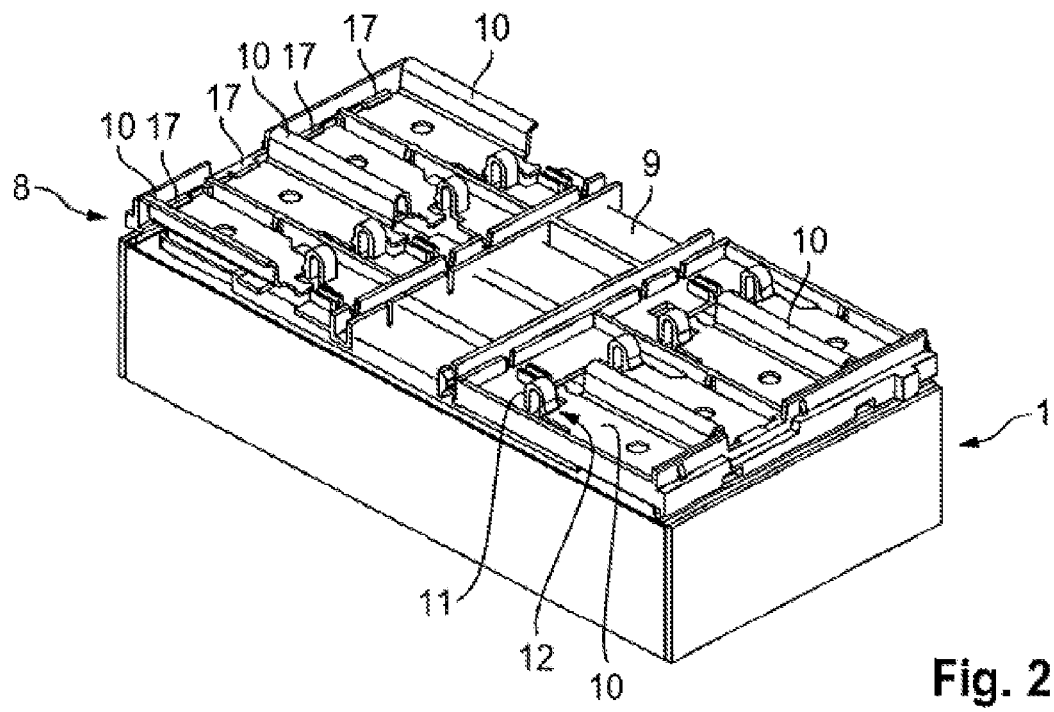
FIG. 2 shows a cell contacting arrangement of the invention according to the embodiment.

FIG. 2 shows the cell contacting arrangement 8 of the invention mounted on the energy storage module 1. The cell contacting arrangement 8 comprises a carrier plate 9, produced as an injection-molded part from plastics. Plural cell connectors 10, made from aluminum, are inserted into the carrier plate 9. FIG. 3 shows a detail section of FIG. 2. Each of the cell connectors 10 comprises two connection surfaces 19. The two connection surfaces 19 are interconnected via a connection arc 18 of the cell connector 10. The two connection surfaces 19 are respectively placed on a connection terminal 3, 4 of two different storage cells 2. The connection surfaces 19 are welded to said connection terminal. In the illustrated embodiment a cell connector 10 thereby connects two respective connection terminals 3 5.

Per cell connector 10, the carrier plate 9 comprises two catch springs 1 with a respective detent 12. The catch springs 11 and the detents 12 hold the cell connector 10 in the respective region of the connection surfaces 19. The catch springs 11 with the detents 12 are integrally produced with the remaining carrier plate 9 from plastics.

The catch springs 11 are made arcuate. A first end 15 of the arc is connected to the remaining carrier plate 9. The detent 12 is formed on the second end 16 of the arc. Opposite to the catch spring 11, the cell connector 10 is inserted under a shoulder 17. The shoulder 17 is also an integral part of the carrier plate 9. On the bottom side, the cell connector 10 is located on the carrier plate 9 and on the connection terminals 3, 4, respectively.

Figure 3:
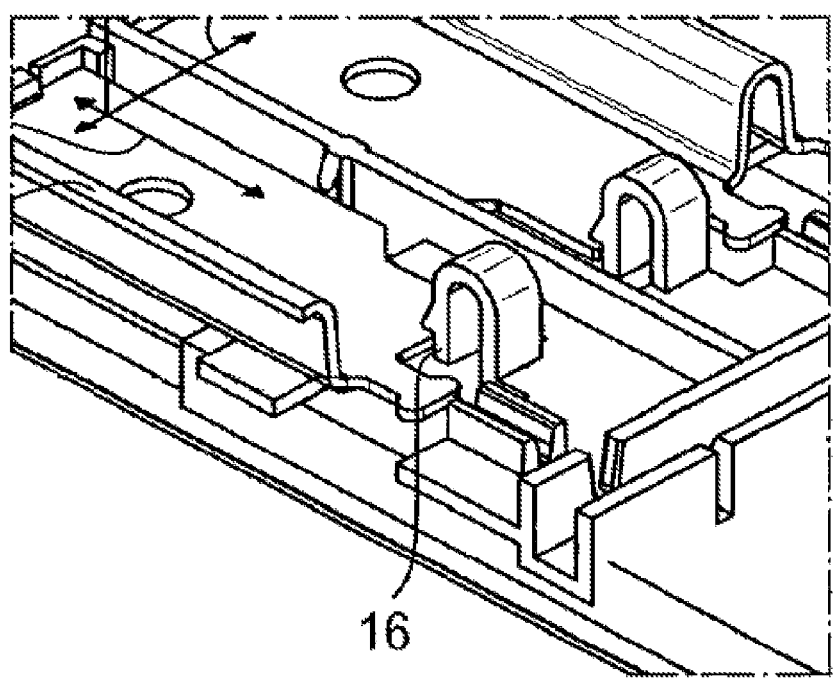
FIG. 3 shows a detail of the cell contacting arrangement of the invention according to the embodiment.

As shown in FIG. 3, three different directions are defined on the cell contacting arrangement 8. A first direction 13 is perpendicular to the plate-shaped connection surface 19. A second direction 14 is perpendicular to the first direction 13 and extends in parallel with the surface of the energy storage module 1. A third direction 21 is perpendicular to the first direction 13 and perpendicular to the second direction 14. The connection terminals 3, 4 are arranged one after the other in said third direction 21. The catch spring 11 is arranged such that it allows a spring-loaded movement of the cell connector 10 in the second direction 14. The detent 12 blocks a movement of the cell connector 10 in the first direction 13. The connection arc 18 between the two connection surfaces 19 allows a certain movement or longitudinal extension of the cell connector 10 in the third direction 21. Furthermore, FIG. 3 shows a thickness 20 of the connection surface 19 of the cell connector 10. The first direction 13 extends in parallel with the direction of the thickness 20. The second direction 14 and the third direction 21 are oriented perpendicular to the thickness 20.

When the cell connector 10 is welded or soldered to the connection terminals 3, 4 and during operation of the energy storage module 1, the cell connector 19 is heated up, resulting in an expansion of the material. The connection arc 18 allows a certain expansion of the cell connector 10 in the third direction 21. The arc-shaped catch spring 11 allows a certain expansion of the cell connector 10 in the second direction 14.

It is ensured with the cell contacting arrangement 8 according to the invention that the cell connector 10 is held at a predetermined position without any play. At the same time, however, the carrier plate 9 allows a certain movement of the cell connector 10 due to internal stress.

LIST OF REFERENCE NUMERALS

1 Energy storage module
2 Storage cells
3, 4 Connection terminals
5, 6 End plates
7 Tie rods
8 Cell contacting arrangement
9 Carrier plate
10 Cell connector
11 Catch spring
12 Detent 13 First direction
14 Second direction
15 First arc end
16 Second arc end
17 Shoulder
18 Connection arc
19 Connection surface
20 Thickness
21 Third direction

The invention claimed is:

1. A cell contacting arrangement for an energy storage module having a plurality of electrochemical storage cells, each storage cell having at least two electric connection terminals, the arrangement comprising:
a carrier plate which is mountable on the energy storage module,
at least one cell connector inserted into the carrier plate for connecting at least two of the connection terminals of different storage cells,
the carrier plate comprising at least one catch spring having a detent for fixing the cell connector in the carrier plate, and
wherein the catch spring is configured to be arcuate, a first end of the arc being connected to the carrier plate, and the detent being arranged on the second end of the arc.

2. The cell contacting arrangement according to claim 1, wherein the catch spring and the detent are integrally produced with the carrier plate.

3. The cell contacting arrangement according to claim 1, wherein a catch spring with a detent is provided per connection terminal contacted by the cell connector.

4. The cell contacting arrangement according to claim 1, wherein the cell connector at the side opposite to the catch spring is pushed under a shoulder of the carrier plate.

5. The cell contacting arrangement according to claim 1, wherein the cell connector comprises connection surfaces which are configured for connection with the connection terminals.

6. The cell contacting arrangement according to claim 1, wherein the cell connector comprises connection surfaces which are configured for connection with the connection terminals, and the detent blocks a movement of the cell connector in a first direction, and that the catch spring allows a spring-loaded movement of the cell connector in a second direction perpendicular to the first direction.

7. The cell contacting arrangement according to claim 6, wherein the cell connector comprises connection surfaces which are configured for connection with the connection terminals, and the connection surface is configured as a plate, the second direction extending perpendicular to the direction of the thickness of the plate.

8. The cell contacting arrangement according to claim 6, wherein the cell connector comprises connection surfaces which are configured for connection with the connection thermals, and the connection surfaces of the cell connector for the connection terminals to be connected are arranged one after the other in a third direction, the third direction being perpendicular to the second direction.

9. The cell contacting arrangement according to claim 1, wherein the cell connector between two connection surfaces comprises a connection arc for compensating for internal stresses in the cell connector.

10. A high-voltage storage device for power supply, particularly of an automotive vehicle, comprising:
an energy storage module having a plurality of electrochemical storage cells, each storage cell having at least two electric connection terminals, and
a cell contacting arrangement according to claim 1.

11. A cell contacting arrangement for an energy storage module having a plurality of electrochemical storage cells, each storage cell having at least two electric connection terminals, the arrangement comprising:
a carrier plate which is mountable on the energy storage module,
at least one cell connector inserted into the carrier plate for connecting at least two of the connection terminals of different storage cells,
the carrier plate comprising at least one catch spring having a detent for fixing the cell connector in the carrier plate,
wherein the catch spring is configured to be arcuate, a first end of the arc being connected to the carrier plate, and the detent being arranged on the second end of the arc, and
wherein the cell connector comprises connection surfaces which are configured for connection with the connection terminals, and the detent blocks a movement of the cell connector in a first direction, and that the catch spring allows a spring-loaded movement of the cell connector in a second direction perpendicular to the first direction.

12. The cell contacting arrangement according to claim 11, wherein the catch spring and the detent are integrally produced with the carrier plate.

13. The cell contacting arrangement according to claim 11, wherein a catch spring with a detent is provided per connection terminal contacted by the cell connector.

14. The cell contacting arrangement according to claim 11, wherein the cell connector at the side opposite to the catch spring is pushed under a shoulder of the carrier plate.

15. The cell contacting arrangement according to claim 11, wherein the cell connector comprises connection surfaces which are configured for connection with the connection terminals, and the connection surface is configured as a plate, the second direction extending perpendicular to the direction of the thickness of the plate.

16. The cell contacting arrangement according to claim 11, wherein the cell connector comprises connection surfaces which are configured for connection with the connection thermals, and the connection surfaces of the cell connector for the connection terminals to be connected are arranged one after the other in a third direction, the third direction being perpendicular to the second direction.

17. The cell contacting arrangement according to claim 11, wherein the cell connector between two connection surfaces comprises a connection arc for compensating for internal stresses in the cell connector.

18. A high-voltage storage device for power supply, particularly of an automotive vehicle, comprising:
an energy storage module having a plurality of electrochemical storage cells, each storage cell having at least two electric connection terminals, and
a cell contacting arrangement according to claim 11.

* * * * *